US010192182B2

(12) United States Patent
Whipple et al.

(10) Patent No.: US 10,192,182 B2
(45) Date of Patent: Jan. 29, 2019

(54) AERIAL DRONE FOR WELL-SITE AND SIGNAL SURVEY

(71) Applicant: WellAware Holdings, Inc., San Antonio, TX (US)

(72) Inventors: John Whipple, San Antonio, TX (US); Nakul Jeirath, San Antonio, TX (US); Cameron Archer, San Antonio, TX (US); David Allen Sisk, San Antonio, TX (US); Stephen Gray, San Antonio, TX (US); Cody James Lee, San Antonio, TX (US); Jesus Gonzalez, Jr., San Antonio, TX (US); Theodore Wilmes, Bloomington, IN (US)

(73) Assignee: WellAware Holdings, Inc., San Antonio, TX (US)

( * ) Notice: Subject to any disclaimer, the term of this patent is extended or adjusted under 35 U.S.C. 154(b) by 789 days.

(21) Appl. No.: 14/734,153

(22) Filed: Jun. 9, 2015

(65) Prior Publication Data
US 2015/0356482 A1 Dec. 10, 2015

Related U.S. Application Data

(60) Provisional application No. 62/010,139, filed on Jun. 10, 2014.

(51) Int. Cl.
*G06Q 10/06* (2012.01)
*G06Q 50/06* (2012.01)

(52) U.S. Cl.
CPC ....... *G06Q 10/06313* (2013.01); *G06Q 50/06* (2013.01)

(58) Field of Classification Search
None
See application file for complete search history.

(56) References Cited

U.S. PATENT DOCUMENTS

| 4,686,474 A | * | 8/1987 | Olsen | ............... G01V 3/165 |
| | | | | 324/331 |
| 4,814,711 A | * | 3/1989 | Olsen | ............... G01V 1/22 |
| | | | | 324/331 |

(Continued)

OTHER PUBLICATIONS

Adamson, Mackenzie, "Drone Aeromagnetics: A New Method for Locating Abandoned Oil and Gas Wells", Mar. 17, 2017, Master of Science Thesis, Department of Geology, SUNY-Buffalo (Year: 2017).*

(Continued)

*Primary Examiner* — Leland Marcus
(74) *Attorney, Agent, or Firm* — Fish & Richardson P.C.

(57) ABSTRACT

Implementations are directed to surveying equipment and/or signals at well sites using an aerial drone. In some implementations, actions include receiving data provided from the aerial drone, the data including signal measurement data, location data, and one or more of image data and video data associated with a well-site, processing the data to provide one or more of a signal survey and a well-site survey associated with the well-site, the signal survey indicating a strength of a signal at multiple locations of the well-site, the well-site survey indicating one or more pieces of equipment located at the well-site, and providing the one or more of the signal survey and the well-site survey to provide an equipment schedule, the equipment schedule identifying equipment to be installed at the well-site and, for at least one piece of equipment, a location to install the at least one piece of equipment.

20 Claims, 8 Drawing Sheets

(56) References Cited

U.S. PATENT DOCUMENTS

| | | | | |
|---|---|---|---|---|
| 5,821,414 | A * | 10/1998 | Noy | E21B 47/022 73/152.54 |
| 6,317,029 | B1 * | 11/2001 | Fleeter | H04B 7/1851 340/10.32 |
| 6,549,879 | B1 * | 4/2003 | Cullick | E21B 49/00 702/11 |
| 6,967,589 | B1 * | 11/2005 | Peters | E21B 47/00 166/250.15 |
| 8,212,210 | B2 | 7/2012 | Hargel | |
| 9,116,041 | B1 | 8/2015 | Cambrea | |
| 9,913,100 | B2 * | 3/2018 | Agarwal | G01C 21/206 |
| 2002/0177955 | A1 * | 11/2002 | Jalali | E21B 43/00 702/9 |
| 2006/0176169 | A1 * | 8/2006 | Doolin | G08B 17/00 340/521 |
| 2007/0179640 | A1 * | 8/2007 | Moughler | E02F 9/2045 700/36 |
| 2008/0084858 | A1 * | 4/2008 | Hart | H04W 64/00 370/342 |
| 2009/0239550 | A1 * | 9/2009 | Myers | G01S 5/14 455/456.1 |
| 2009/0284258 | A1 * | 11/2009 | Morrison | B64B 1/02 324/330 |
| 2010/0061703 | A1 * | 3/2010 | Pham | G08B 21/02 386/241 |
| 2011/0066379 | A1 * | 3/2011 | Mes | G01V 3/165 702/6 |
| 2011/0278458 | A1 | 11/2011 | Hill, Jr. | |
| 2012/0054270 | A1 * | 3/2012 | Foreman | G06Q 10/10 709/203 |
| 2012/0224549 | A1 * | 9/2012 | Myers | H03J 7/02 370/329 |
| 2014/0035752 | A1 * | 2/2014 | Johnson | A01G 22/00 340/601 |
| 2014/0129296 | A1 * | 5/2014 | Muraviyova | G06Q 10/06393 705/7.39 |
| 2014/0198670 | A1 * | 7/2014 | Mahasenan | H04W 24/00 370/252 |
| 2014/0379133 | A1 * | 12/2014 | Toma | E21B 44/00 700/275 |
| 2015/0030987 | A1 | 1/2015 | Pathangay et al. | |
| 2015/0126129 | A1 * | 5/2015 | Rangappagowda | H04W 24/06 455/67.11 |
| 2015/0142391 | A1 * | 5/2015 | Flynn | G06F 17/5004 703/1 |
| 2015/0192437 | A1 | 7/2015 | Bouzas et al. | |
| 2015/0229654 | A1 * | 8/2015 | Perier | H04W 12/06 726/3 |
| 2015/0234387 | A1 * | 8/2015 | Mullan | G05D 1/104 701/3 |
| 2015/0350844 | A1 * | 12/2015 | Agarwal | G01C 21/206 455/456.2 |

OTHER PUBLICATIONS senseFly.com [online], "The Professional's Mapping Drone of Choice" Publicly Available on Apr. 3, 2013, [retrieved on May 31, 2017]. Retrieved from the Internet: URL <https://ww.sensefly.com/home.html/>. 3 pages.

Link.brightcove.com [online], "OGI: Natural Gas Detection: Storage Tank Levels & Leak," May 31, 2005, [Retrieved on May 31, 2017], Retrieved from the Internet: URL<http://bcove.me/812f9lcd> 1 page.

Link.brightcove.com [online], "OGI: Natural Gas Detection: Pig Trap Seal Leak," Jul. 26, 2008, [Retrieved on May 31, 2017] Retrieved from the Internet: URL<http://bcove.me/erewms61>. 1 page.

Evitech.com [online], "Gas Leak Monitoring" Publicly Available on Sep. 19, 2016 [Retrieved on May 31, 2017] Retrieved from the internet: URLhttp://web.archive.org/web/20160919011319/http://www.evitech.com/index.php/en/solutions/video-motion-detection-oil-a-gas. 2 pages.

RebellionPhotonics.com [online], "Gas Leak Monitoring" Publicly Available on Sep. 11, 2010 [Retrieved on May 31, 2017] Retrieved from the internet: URL http://rebellionphotonics.com/>. 3 pages.

'hazardexonthenet.net' [online] "SF6 Greenhouse gas detection camera," Oct. 15, 2009, [retrieved from the internet: URL<http://www.hazardexonthenet.net/article/28774/SF6-Greenhouse-gas-detection-camera.aspx>, 2 pages.

* cited by examiner

AERIAL DRONE FOR WELL-SITE AND SIGNAL SURVEY

CROSS-REFERENCE TO RELATED APPLICATIONS

This application claims priority to U.S. Prov. App. No. 62/010,139, filed on Jun. 10, 2014, the disclosure of which is expressly incorporated herein by reference in the entirety.

BACKGROUND

Oil and gas production assets are often distributed across remote locations. For example, well-sites can be remote from convention communications equipment making the retrieval of well-site data difficult and unreliable. Some locations can be so remote, that periodic on-site visits are required to manually or semi-manually retrieve data.

To enable remote monitoring and/or controlling of well-site equipment, sensors, actuators, and data communication equipment must be installed at or near a well-site. Given the remote location of well-sites and distances between well-sites, determining appropriate equipment and locating such equipment at or near a well-site can be difficult and time-consuming.

SUMMARY

Implementations of the present disclosure include computer-implemented methods for surveying sites and/or signals at sites, such as well sites, using aerial drones. In some implementations, actions include receiving data provided from the aerial drone, the data including signal measurement data, location data, and one or more of image data and video data associated with a well-site, processing the data to provide one or more of a signal survey and a well-site survey associated with the well-site, the signal survey indicating a strength of a signal at multiple locations of the well-site, the well-site survey indicating one or more pieces of equipment located at the well-site, and providing the one or more of the signal survey and the well-site survey to provide an equipment schedule, the equipment schedule identifying equipment to be installed at the well-site and, for at least one piece of equipment, a location to install the at least one piece of equipment. Other implementations include corresponding systems, apparatus, and computer programs, configured to perform the actions of the methods, encoded on computer storage devices.

These and other implementations can each optionally include one or more of the following features: actions further include providing the one or more of the signal survey and the well-site survey to a mobile computing device for display of a graphical representation of the well-site based on the one or more of the signal survey and the well-site survey; the graphical representation includes a signal map that indicates signal strengths at locations within the well-site; the signal map includes a heat map including a plurality of regions; the graphical representation includes a multi-dimensional representation of the well-site; the graphical representation includes one or more labels, each label identifying a type of equipment at the well-site, and being automatically determined based on processing the data; processing the data to provide one or more of a signal survey and a well-site survey includes processing the data based on one or more well-site models to identify at least one piece of equipment located at the well-site; the equipment schedule includes communications equipment that is to be installed at the well-site to enable one or more of remote monitoring and remote control of the well-site; and the signal includes a random phase multiple access (RPMA) signal.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to surveying sites and/or signals using aerial drones. More particularly, implementations of the present disclosure are directed to using aerial drones to survey sites, such as well-sites, to determine assets, e.g., equipment, located at a site, and/or a configuration of the site. Implementations of the present disclosure are further directed to using aerial drones to survey signal quality, e.g., signal strength, at or near sites, such as well-sites. In some examples, signal surveys evaluate propagation of random phase multi-access (RPMA) signals. In some implementations, site surveys are used to plan deployment of remote monitoring and/or remote control equipment. For example, site surveys are used to identify assets that can be remotely monitored and/or remotely controlled. In some implementations, site surveys are used to populate mobile and web-based clients, to accurately depict sites and assets located at the sites. In some implementations, signal surveys are used to determine appropriate location of remote monitoring and/or remote control equipment. For example, and as discussed in further detail herein, placement of transmitters and/or receivers at a site can be determined for equipment installation, and/or so-called signal dead-zones can be remediated.

Implementations of the present disclosure will be discussed in further detail with reference to an example context. The example context includes oil and gas well-sites. It is appreciated, however, that implementations of the present disclosure can be realized in other appropriate contexts, e.g., a chemical plant, a fertilizer plant, tank batteries (located away from a site), above-ground appurtenances (pipelines) and/or intermediate sites. An example intermediate site can include a central delivery point that can be located between a site and a refinery, for example. Within the example context, implementations of the present disclosure are discussed in further detail with reference to an example sub-context. The example sub-context includes a production well-site. It is appreciated, however, that implementations of the present disclosure can be realized in other appropriate sub-contexts, e.g., an exploration well-site, a configuration well-site, an injection well-site, an observation well-site, and a drilling well-site.

In the example context and sub-context, well-sites can be located in natural resource plays. A natural resource play can be associated with oil and/or natural gas. In general, a natural resource play includes an extent of a petroleum-bearing formation, and/or activities associated with petroleum development in a region. An example geographical region can include southwestern Texas in the United States, and an example natural resource play includes the Eagle Ford Shale Play.

Figure 1:
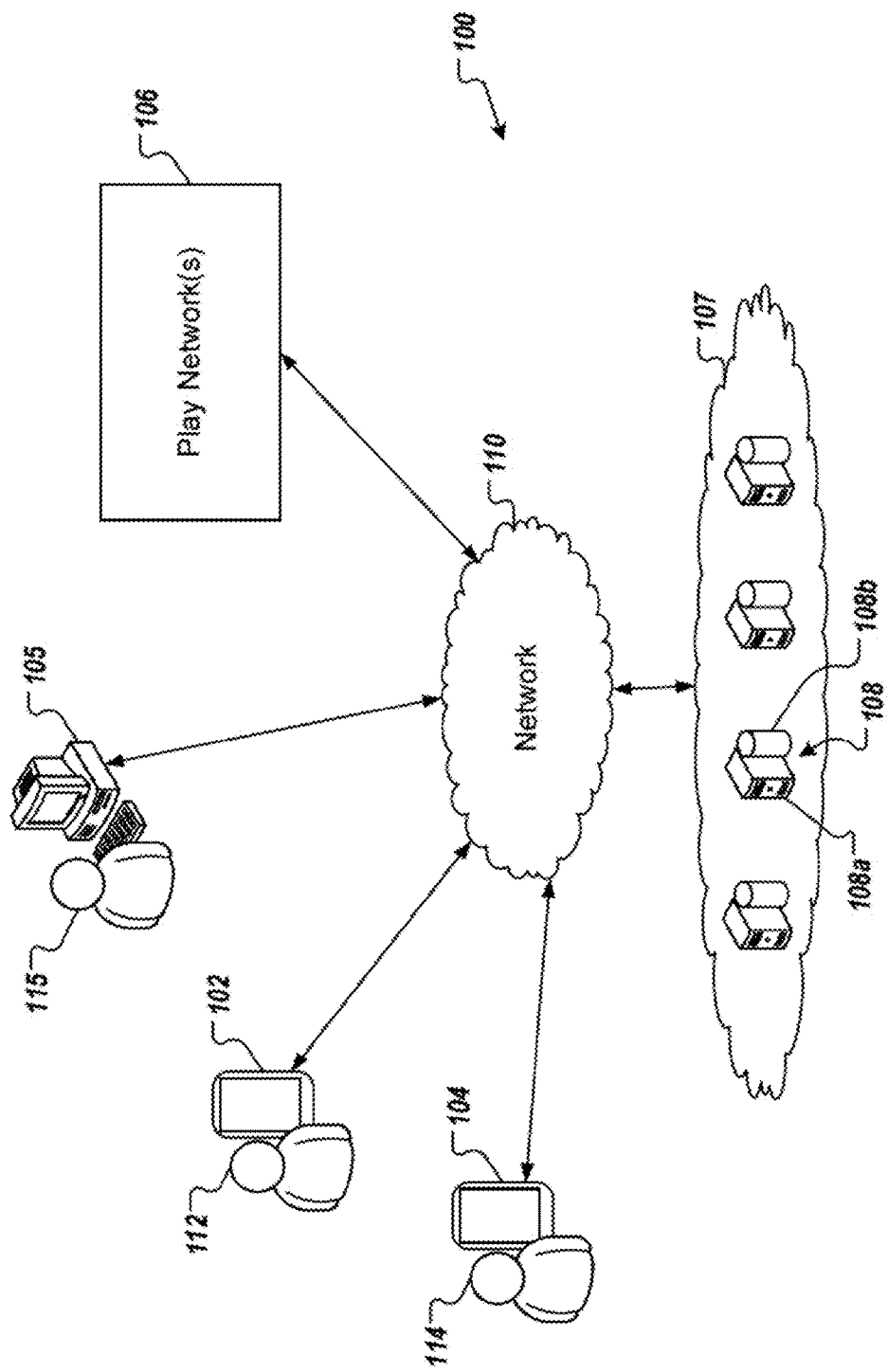
FIG. 1 depicts an example system in accordance with implementations of the present disclosure.

FIG. 1 depicts an example system 100 that can execute implementations of the present disclosure. The example system 100 includes one or more computing devices, such as computing devices 102, 104, 105, one or more play networks 106, and a computing cloud 107 that includes one or more computing systems 108. The example system 100 further includes a network 110. The network 110 can include a large computer network, such as a local area network (LAN), wide area network (WAN), the Internet, a cellular network, a satellite network, a mesh network, e.g., 900 Mhz, one or more wireless access points, or a combination thereof connecting any number of mobile clients, fixed clients, and servers. In some examples, the network 110 can be referred to as an upper-level network.

The computing devices 102, 104, 105 are associated with respective users 112, 114, 115. In some examples, the computing devices 102, 104, 105 can each include various forms of a processing device including, but not limited to, a desktop computer, a laptop computer, a tablet computer, a wearable computer, a handheld computer, a personal digital assistant (PDA), a cellular telephone, a network appliance, a smart phone, an enhanced general packet radio service (EGPRS) mobile phone, or an appropriate combination of any two or more of these example data processing devices or other data processing devices. The computing systems 108 can each include a computing device 108a and computer-readable memory provided as a persistent storage device 108b, and can represent various forms of server systems including, but not limited to a web server, an application server, a proxy server, a network server, or a server farm.

In some implementations, and as discussed in further detail herein, site data (e.g., oil data and/or gas data) can be communicated from one or more of the play networks 106 to the computing systems 108 over the network 110. In some examples, each play network 106 can be provided as a regional network. For example, a play network can be associated with one or more plays within a geographical region. In some examples, each play network 106 includes one or more sub-networks. As discussed in further detail herein, example sub-networks can include a low power data sub-network, e.g., a low power machine-to-machine data network (also referred to as a smart data network and/or an intelligent data network, one or more wireless sub-networks, and mesh sub-networks, e.g., 900 Mhz.

In some examples, the computing systems 108 store the well data and/or process the well data to provide auxiliary data. In some examples, the well data and/or the auxiliary data are communicated over the play network(s) 106 and the network 110 to the computing devices 102, 104 for display thereon. In some examples, user input to the computing devices 102, 104 can be communicated to the computing systems 108 over the network 110.

In general, monitoring of well sites can include oil well monitoring and natural gas well monitoring (e.g., pressure(s), temperature(s), flow rate(s)), compressor monitoring (e.g., pressure, temperature), flow measurement (e.g., flow rate), custody transfer, tank level monitoring, hazardous gas detection, remote shut-in, water monitoring, cathodic protection sensing, asset tracking, water monitoring, access monitoring, and valve monitoring. In some examples, monitoring can include monitoring the presence and concentration of fluids (e.g., gases, liquids). In some examples, control capabilities can be provided, such as remote valve control, remote start/stop capabilities, remote access control.

In some implementations, and as described in further detail herein, data recorded by one or more aerial drones can be provided to the system 100 to produce one or more site surveys and/or one or more signal surveys. In some examples, data including images and video of a geographical region and/or signal strength samples over the geographical region is provide to one or more computing devices. In some examples, the data is provided to the computing cloud 107, which processes the data to provide the one or more site surveys and/or one or more signal surveys. In some examples, the data is provided to a computing device, such as the computing device 105, which processes the data to provide the one or more site surveys and/or one or more signal surveys.

Figure 2:
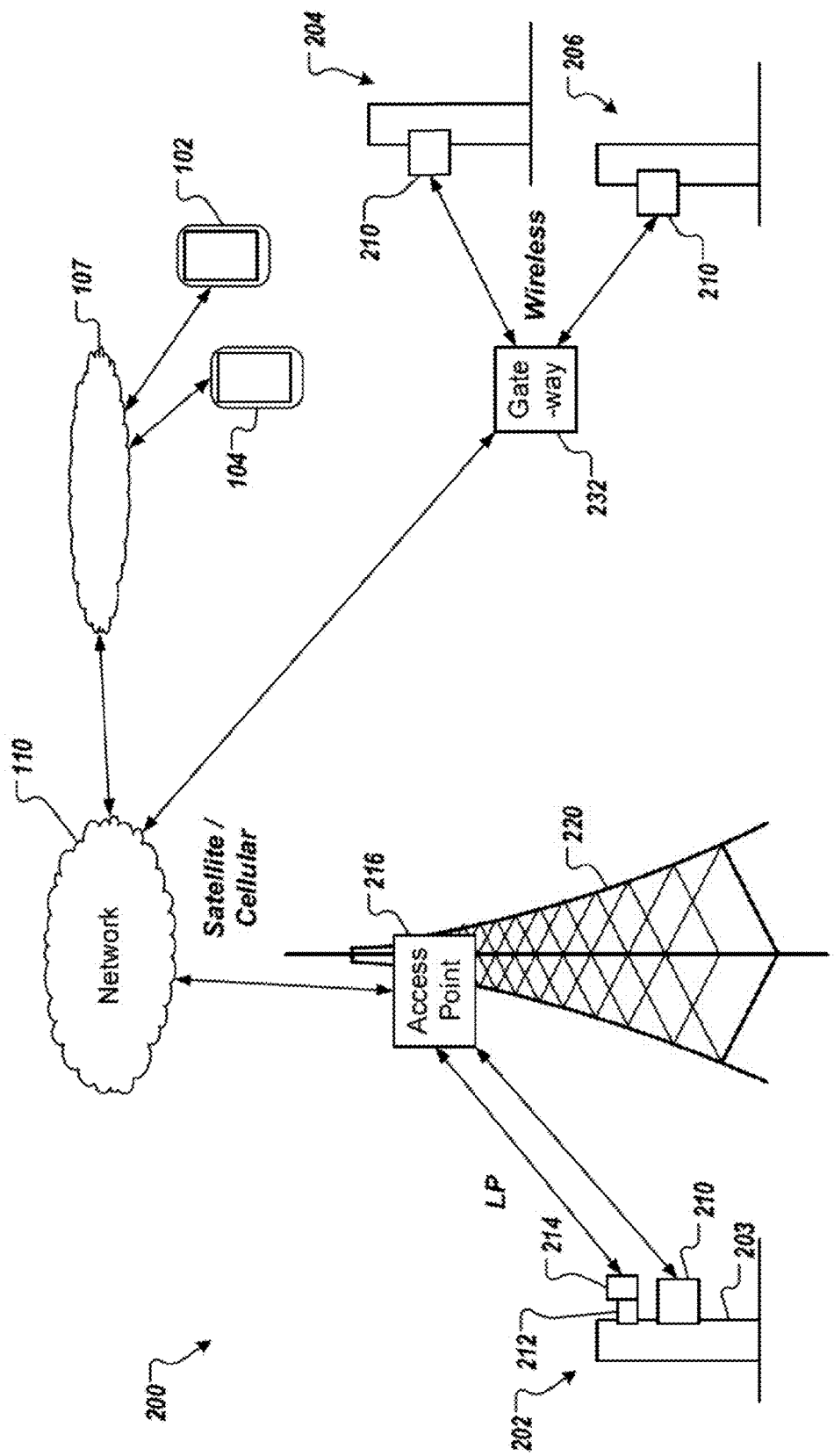
FIG. 2 depicts an example portion of a play network.

FIG. 2 depicts an example portion of an example play network 200. The example play network 200 provides low power (LP) communication, e.g., using a low power data network, and cellular and/or satellite communication for well data access and/or control. In some examples, as discussed herein, LP communication can be provided by a LP network. In the example of FIG. 2, a first well site 202, a second well site 204 and a third well site 206 are depicted. Although three well sites are depicted, it is appreciated that the example play network 200 can be associated with any appropriate number of well sites. In the example of FIG. 2, well monitoring and data access for the well site 202 is provided by the play network 200 using LP communication and cellular and/or satellite communication, and well monitoring and data access for the well sites 204, 206 is provided by the play network 200 using cellular, satellite, and/or mesh network communication.

The example of FIG. 2 corresponds to the example context and sub-context (a production well-site) discussed above. It is appreciated, however, that implementations of the present disclosure are applicable in any appropriate context. In the depicted example, the well site 202 includes a wellhead 203, a sensor system 210, a sensor system 212 and communication device 214. In some examples, the sensor system 210 includes a wireless communication device that is connected to one or more sensors, the one or more sensors monitoring parameters associated with operation of the wellhead 203. In some examples, the wireless communication device enables monitoring of discrete and analog signals directly from the connected sensors and/or other signaling devices. In some examples, the sensor system 210 can provide control functionality (e.g., valve control). Although a single sensor system 210 is depicted, it is contemplated that a well site can include any appropriate number of sensor systems 210. In some examples, the sensor system 212 includes one or more sensors that monitor parameters associated with operation of the wellhead 203. In some examples, the sensor system 212 generates data signals that are provided to the communication device 214, which can forward the data signals. Although a single sensor system 212 and communication device 214 are depicted, it is contemplated that a well site can include any appropriate number of sensor systems 212 and/or communication devices 214.

Well data and/or control commands can be provided to/from the well site 202 through an access point 216. More particularly, information can be transmitted between the access point 216, the sensor system 210, and/or the communication device 214 based on LP. In some examples, LP provides communication using a globally certified, license free spectrum (e.g., 2.4 GHz). In some examples, the access point 216 provides a radial coverage that enables the access point 216 to communicate with numerous well sites, such as the well site 202. In some examples, the access point 216 further communicates with the network 110 using cellular, satellite, mesh, point-to-point, point-to-multipoint radios, and/or terrestrial or wired communication.

In the depicted example, the access point 216 is mounted on a tower 220. In some examples, the tower 220 can include an existing telecommunications or other tower. In some examples, an existing tower can support multiple functionalities. In this manner, erection of a tower specific to one or more well sites is not required. In some examples, one or more dedicated towers could be erected.

In the depicted example, the well sites 204, 206 include respective wellheads 205, 207, and respective sensor systems 210 (discussed above). Although a single sensor system 210 is depicted for each well site 204, 206, it is contemplated that a well site can include any appropriate number of sensor systems 210. In some examples, well data and/or control commands can be provided to/from the well sites 202 through a gateway 232. More particularly, information can be transmitted between the gateway 232, and the sensor systems 210 can be wireless communication (e.g., radio frequency (RF)). In some examples, the gateway 232 further communicates with the network 110 using cellular and/or satellite communication.

In accordance with implementations of the present disclosure, well site control and/or data visualization and/or analysis functionality (e.g., hosted in the computing cloud 107 of FIGS. 1 and 2) and one or more play networks (e.g., the play networks 106, 200 of FIGS. 1 and 2) can be provided by a service provider. In some examples, the service provider provides end-to-end services for a plurality of well sites. In some examples, the service provider owns the one or more play networks and enables well site operators to use the play networks and control/visualization/monitoring functionality provided by the service provider. For example, a well site operator can operate a plurality of well sites (e.g., the well sites 202, 204, 206). The well site operator can engage the service provider for well site control/visualization/monitoring services (e.g., subscribe for services) through a play network (e.g., the play network 200). In some examples, the service provider and/or the well site operator can install appropriate sensor systems, communication devices and/or gateways (e.g., as discussed above with reference to FIG. 2). In some examples, sensor systems, communication devices and/or gateways can be provided as end-points that are unique to the well site operator.

In some implementations, the service provider can maintain one or more indices of end-points and well site operators. In some examples, the index can map data received from one or more end-points to computing devices associated with one or more well site operators. In some examples, well site operators can include internal server systems and/or computing devices that can receive well data and/or auxiliary data from the service provider. In some examples, the service provider can receive messages from well sites, the messages can include, for example, well data and an end-point identifier. In some examples, the service provider can route messages and/or auxiliary data generated by the server provider (e.g., analytical data) to the appropriate well site operator or personnel based on the end-point identifier and the index. Similarly, the service provider can route messages (e.g., control messages) from a well site operator to one or more appropriate well sites.

Figure 3:
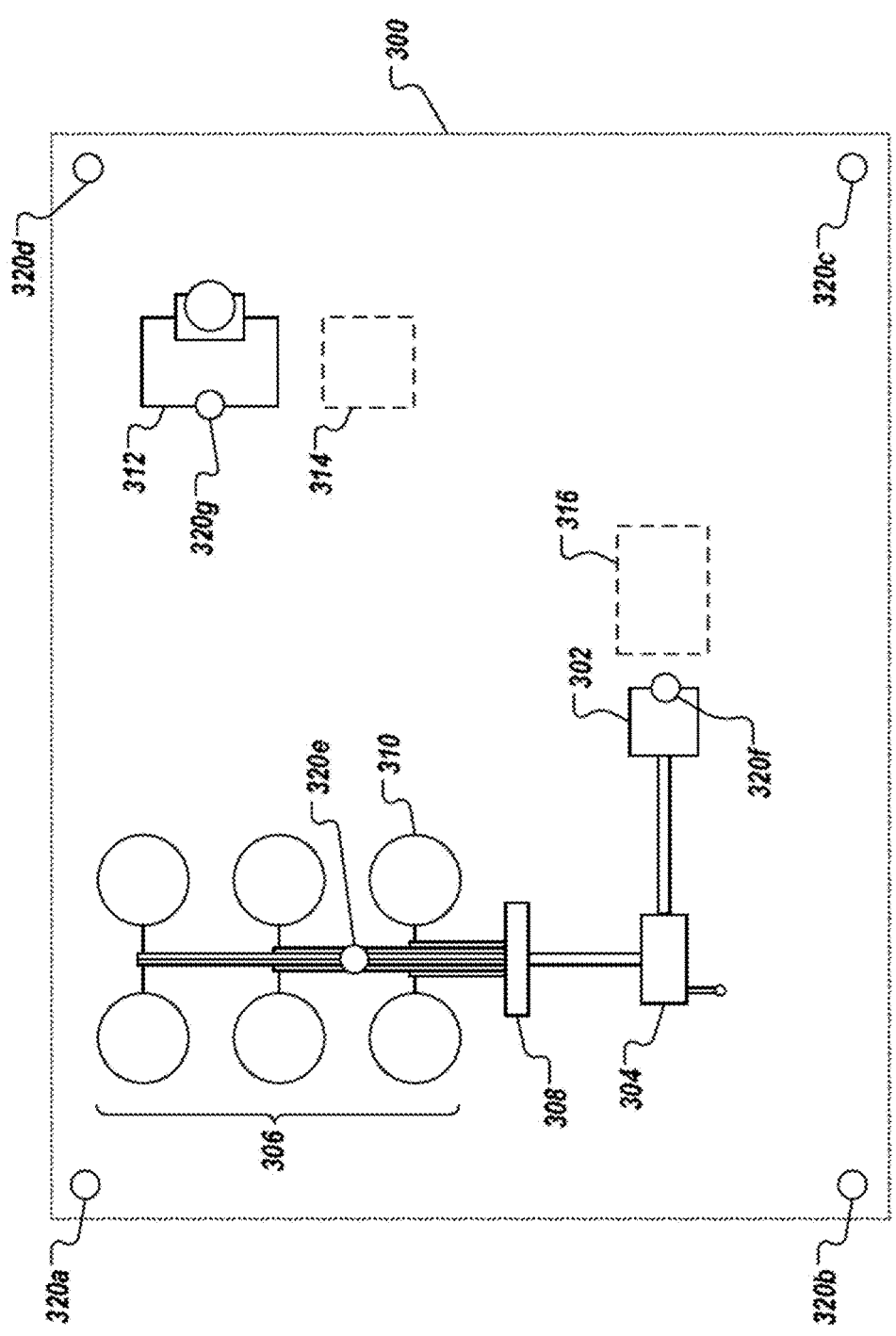
FIG. 3 depicts a representation of an example well-site.

FIG. 3 depicts a representation of an example well-site 300. The example well-site 300 can include a production well-site, in accordance with the example sub-context provided above. In the depicted example, the well-site 300 includes a well-head 302, an oil and gas separator 304 and a storage tank system 306. In the depicted example, the storage tank system 306 includes a manifold 308 and a plurality of storage tanks 310. The example well-site 300 further includes a base station 312. In some examples, the well-site 300 can include a local weather station 314. In some examples, the well-site 300 can include artificial lift equipment 316 (e.g., to assist in extraction of oil and/or gas from the well).

In some examples, the well-site 300 includes one or more sensors 320a-320g. In some examples, each sensor 320a-320g can be provided as a single sensor. In some examples, each sensor 320a-320g can be provided as a cluster of sensors, e.g., a plurality of sensors. Example sensors can include fluid sensors, e.g., gas sensors, temperature sensors, and/or pressure sensors. Each sensor 320a-320g is responsive to a condition, and can generate a respective signal based thereon. In some examples, the signals can be communicated through a network, as discussed above with reference to FIG. 2. In some examples, the signals can be communicated to a chart recorder, which can draw traces on a chart in response to signals, as discussed herein.

With continued reference to FIG. 3, sensors 320a-320g can include temperature sensors and/or pressure sensors. For example, the sensors 320a-320g can be responsive to the temperature and/or pressure of a fluid. That is, the sensors 320a-320g can generate respective signals that indicate the temperature and/or pressure of a fluid. As discussed herein, data from the sensors 320a-320g can be provided to a back-end system for processing. For example, data can be provided through a play network, e.g., the play network(s) 106 of FIG. 1, to a computing cloud, e.g., the computing cloud 107. As also discussed herein, signals from one or more sensors can be provided to a chart recorder, which can draw traces on a chart in response to the signals.

As introduced above, implementations of the present disclosure are directed to providing site surveys and/or signal surveys using aerial drones. More particularly, implementations of the present disclosure are directed to using aerial drones to survey sites, such as well-sites, to determine assets, e.g., equipment, located at a site and a configuration of the site, e.g., respective locations of assets at the site. Implementations of the present disclosure are further directed to using aerial drones to survey signal quality, e.g., signal strength, at or near sites, such as well-sites. In some examples, signal surveys evaluate propagation of random phase multi-access (RPMA) signals.

In some implementations, site surveys are used to plan deployment of remote monitoring and/or remote control equipment. For example, site surveys are used to identify assets that can be remotely monitored and/or remotely controlled. In some implementations, site surveys are used to populate mobile and web-based clients, to accurately depict sites and assets located at the sites. In some implementations, signal surveys are used to determine appropriate location of remote monitoring and/or remote control equipment. For example, and as discussed in further detail herein, placement of transmitters and/or receivers at a site can be determined for equipment installation, and/or so-called signal dead-zones can be remediated.

Figure 4:
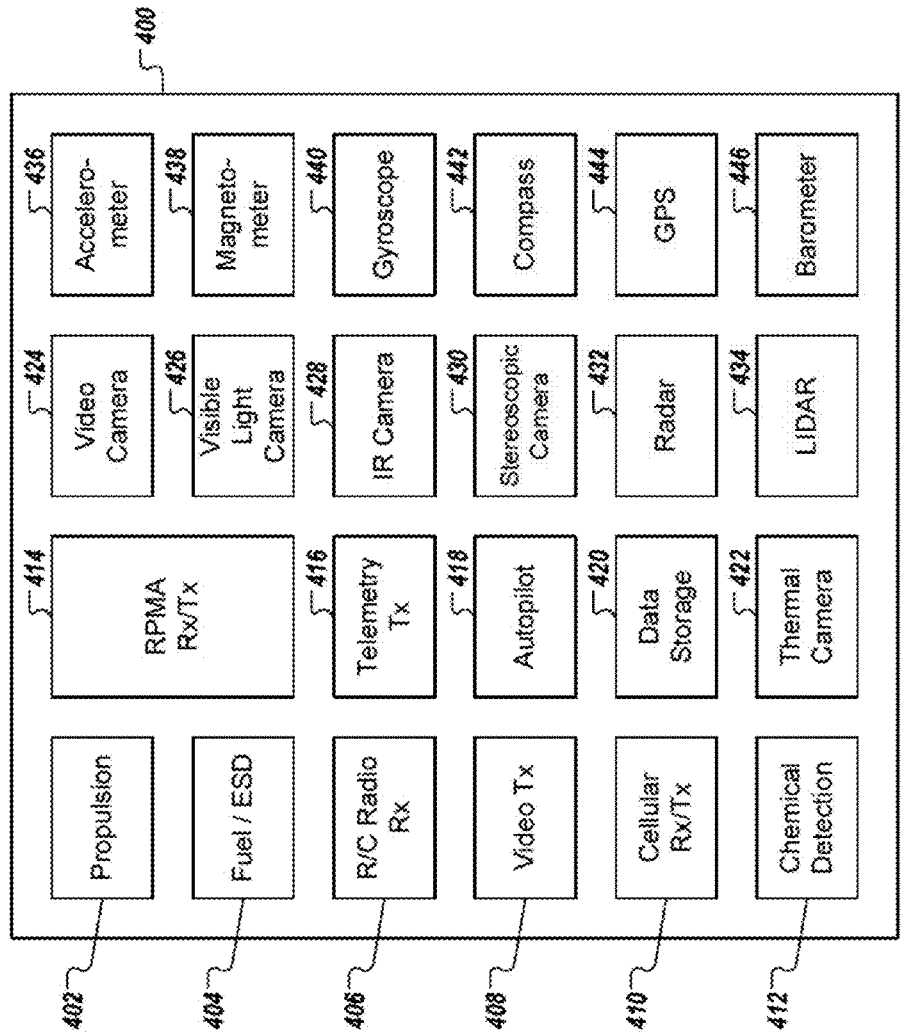
FIG. 4 depicts a block diagram representing an example aerial drone.

FIG. 4 depicts a block diagram representing an example aerial drone 400. In some examples, the aerial drone 400 can be remotely controlled to fly over a geographical region that includes one or more well-sites, in the example context. In some examples, the aerial drone 400 can be programmed to fly a course over a geographical region that includes one or more well-sites. In some examples, the aerial drone 400 is provided as a fixed wing aircraft. In some examples, the aerial drone 400 is provided as a rotary wing aircraft.

In the example of FIG. 4, the aerial drone 400 includes a propulsion system 402, and an energy source 404. Example propulsion systems 402 include one or more combustion engines that drive one or more propellers or blades, and one or more electric machines that drive one or more propellers or blades. It is contemplated, however, that the aerial drone 400 can be propelled by any appropriate propulsion system, or combination of propulsion systems. Example energy sources 404 can include fuel, e.g., gasoline, and/or an energy storage device, e.g., a battery, a capacitor. In some examples, the energy source 404 includes one or more fuel cells. In some examples, the energy source includes one or more solar panels.

In the depicted example, the aerial drone 400 further includes a radio control (R/C) receiving (Rx) component 406, a video transmitting (Tx) component 408, a cellular receiving/transmitting (Rx/Tx) component 410, a chemical detection component 412, a signal receiving/receiving (Rx/Tx) component 414, a telemetry transmitting (Tx) component 416, an auto-pilot component 418, a data storage component 420, a thermal camera component 422, a video camera component 424, a visible light camera component 426, an infrared camera component 428, a stereoscopic camera component 430, a radar component 432, a light detection and ranging (LIDAR) component 434, an accelerometer component 436, a magnetometer component 438, a gyroscope component 440, a compass component 442, a global positioning system (GPS) component 444, and a barometer component. The components depicted in FIG. 4, and described herein, are example components, and it is appreciated that the aerial drone 400 can include more or fewer components.

In some implementations, the radio control (R/C) receiving (Rx) component 406 and/or the autopilot component 418 enable control of the aerial drone 400. In some examples, the radio control (R/C) receiving (Rx) component 406 receives signals from a remote controller, which signals are processed to control operation of the aerial drone 400 (e.g., control the propulsion system 402, control flight components, such as aileron, flap, elevator, rudder, rotor blade pitch). In some examples, the autopilot component 418 provides control signals to control operation of the aerial drone 400 (e.g., control the propulsion system 402, control flight components, such as aileron, flap, elevator, rudder, rotor blade pitch). In some examples, the autopilot component 418 controls operation of the aerial drone 400 based on a pre-programmed flight plan (e.g., stored in the data storage 420) and one or more signals provided from one or more other components (e.g., the radar component 432, the accelerometer component 436, the magnetometer component 438, the gyroscope component 440, the compass component 442, and/or the GPS component 444).

In some implementations, one or more components of the aerial drone 400 communicate with one another. In some examples, the aerial drone 400 can include a bus system that enables communication between components. For example, data generated and/or received by one or more components can be communicated to the data storage component 420. As another example, data stored in the data storage component can be communicated to one or more other components (e.g., the video transmitting (Tx) component 408 to transmit video data from the aerial drone 400).

In some implementations, one or more camera components can be provided as a single camera. In some examples, the thermal camera component 422, the video camera component 424, the visible light camera component 426, the IR camera component 428, and the stereoscopic camera component 430 can be provided as a single camera component (e.g., a camera that captures visible light images/video, thermal images/video, infrared images/video, and/or stereoscopic images/video), or two or more camera components. In some implementations, the one or more of the camera components 422, 424, 426, 428, 430 capture images and/or video of the geographic region, over which the aerial drone 400 flies. In some examples, and as described in further detail herein, the images and/or video are used to provide one or more site surveys, and/or one or more signal surveys.

In some implementations, the signal receiving/receiving (Rx/Tx) component 414 receives and transmits signals, while the aerial drone 400 flies over the geographic region. In the example context, the signals include RPMA signals. It is appreciated, however, that any appropriate type of signal can be received and/or transmitted. In some examples, and as described in further detail herein, data associated with the signals is used to provide one or more site surveys, and/or one or more signal surveys. Example data can include an identifier indicating a source of a received signal, a strength of a received signal, a location of the aerial drone 400 when a signal is transmitted, and the like.

In accordance with implementations of the present disclosure, an aerial drone, such as the aerial drone 400 of FIG. 4, is flown over a geographical region. In some examples, the geographical region includes one or more well-sites. In some examples, one or more well-sites are to be constructed within the geographical region. In some implementations, the aerial drone captures images and/or video as it flies over the geographical region. In some implementations, the aerial drone periodically captures signal strength, GPS location, multi-resolution (e.g., high resolution, low resolution) images and/or videos and any other sensor data as it flies over the geographical region. In some examples, the aerial drone flies on a flight path that is defined by two or more waypoints (e.g., remotely controlled, on autopilot).

In some implementations, data recorded by the aerial drone is offloaded to one or more computing devices. In some examples, data recorded by the aerial drone (e.g., stored in the data storage component 420) is wirelessly transmitted to the one or more computing devices (e.g., during flight, after the aerial drone lands). In some examples, data recorded by the aerial drone (e.g., stored in the data storage component 420) is transmitted to the one or more computing devices by wire (e.g., after the aerial drone lands). In some implementations, the data is offloaded to one or more computing devices of a back-end system, such as the computing cloud 107 of FIG. 1. In some examples, the data is offloaded to one or more computing devices, such as the computing device 105 of FIG. 1.

In some implementations, signal data is processed to provide a multi-level signal survey for the geographical region. In some examples, the signal survey is provided as a map of signal strength at various locations at or near to a well-site. In some examples, the signal data includes a plurality of signal tuples, each signal tuple being specific to a location, at which the signal strength is measured. For example, in collecting the signal data, the aerial drone can be at a first location, at which a strength of the signal is measured. Consequently, a first signal tuple can be created and can be stored in memory. In some examples, the first signal tuple includes an indicator of the type of signal measured (e.g., RPMA signal), a first strength measurement of the signal, first GPS coordinates of the first location (e.g., latitude and longitude), a first altitude, at which the aerial drone was when the signal strength was measured at the first location. Continuing, the aerial drone can be at a second location, at which a strength of the signal is again measured. Consequently, a second signal tuple can be created and can be stored in memory. In some examples, the second signal tuple includes an indicator of the type of signal measured (e.g., RPMA signal), a second strength measurement of the signal, second GPS coordinates of the second location (e.g., latitude and longitude), a second altitude, at which the aerial drone was when the signal strength was measured at the second location.

In some implementations, multiple signal tuples are processed to provide the signal survey. For example, for each signal tuple, a strength indicator can be generated, and can be used to define regions of signal strength in the signal map for a particular well-site. In some examples, for the plurality of signal tuples, a plurality of strength indicators are provided, that collectively provide an overall condition of signal strength and/or discrete regions of signal strength. For example, each strength indicator can provide a portion of the strength map.

In some examples, a characteristic of the strength indicator can be provided based on the value of the signal strength provided in a respective signal tuple. Example characteristics can include color, shape and/or pattern. In the example case of color, a first strength value (or first range of strength values) can be associated with a first color, and a second strength value (or second range of strength values) can be associated with a second color. If a first strength value provided in a first signal tuple corresponds to the first strength value (or lies within the first range of strength values), a first strength indicator that is provided for the first signal tuple is assigned the first color. Similarly, if a second strength value provided in a second signal tuple corresponds to the second concentration value (or lies within the second range of strength values), a second strength indicator that is provided for the second signal tuple is assigned the second color. The first strength indicator and the second strength indicator together can define at least a portion of the survey map.

Figure 7:
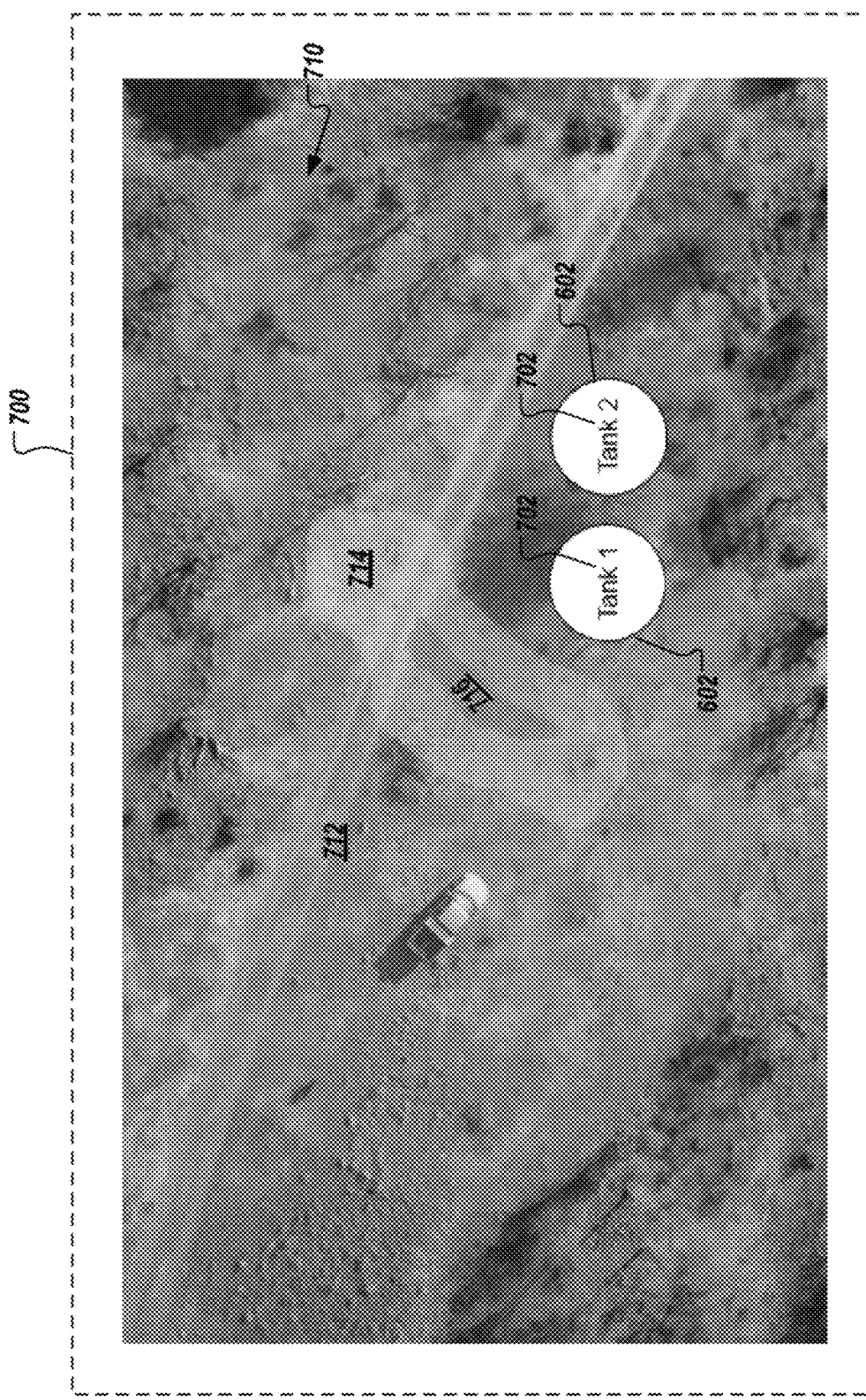
FIG. 7 depicts an example screen-shot depicting a zoomed portion of the example composite image of FIG. 6.

In some examples, output data is processed to provide an array of strength indicator data. In some examples, strength indicator data can be provided as a tuple of values. The following example tuple can be provided:

Strength Indicator Data=$[L,X]$ where X indicates the characteristic to be displayed at location L. In some examples, the location L is provided from GPS data for the respective signal tuple. In some examples, the strength indicator data is processed to provide the signal map. For example, for a particular image of a well-site that is to be displayed, a list of locations included in the image can be provided. In some examples, for each location in the list of locations, the characteristic X (e.g., color) to be displayed can be received from the strength indicator data, and the respective characteristics are displayed over the image at the respective locations. In this manner, and using color as an example, a heat map can be provided for locations in the image, the heat map indicating differing regions of signal strength based on color bands. An example is depicted in FIG. 7, described in detail below.

In some implementations, image data and/or video data are processed to identify one or more assets (e.g., equipment) located at a well-site. Example assets can include those described above with reference to FIG. 3 (e.g. well head(s), compressor(s), canaries, tank(s), separators, etc.). In some examples, the image data and/or video data can be processed based on one or more equipment models and/or well-site models to identify the presence of equipment. In some examples, the one or more equipment models and/or well-site models can each be provided as a multi-layer convolutional network. In some examples, each layer includes one or more parameters that can be represented as respective nodes. In some examples, a node can be connected to one or more other nodes in adjacent layers. In some examples, an untrained model is provided, in which all parameters in all layers are randomly assigned. In some examples, the untrained model is trained based on a training data set to provide the model. In some examples, training of the untrained model includes changing the parameters based on the training data set. In some examples, the training data set includes images and/or multi-dimensional models of equipment.

In some implementations, a multi-dimensional model of individual equipment or a well-site can be provided. In some examples, the multi-dimensional model can be provided as a three-dimensional point cloud. In some examples, the multi-dimensional model relates physical structures, such as equipment, to particular locations, e.g., using GPS data. In some implementations, the multi-dimensional model is combined with image data to provide a well-site survey. In some examples, the well-site survey provides a graphical depiction of equipment located at a surveyed well-site. In some examples, the graphical depiction is interactive, such that a user can manipulate to graphical depiction to take a virtual tour of the well-site.

In accordance with implementations of the present disclosure, the signal survey and the well-site survey of a well-site can be used to plan equipment deployment at the well-site. For example, the well-site survey indicates the number and type of equipment located at the well-site. In this manner, it can be determined what type of sensors, and what type of data can be remotely monitored for the well-site. Based on this information, data collection and/or communication equipment needed to enable remote monitoring and/or control of the well-site can be determined. In some examples, communication equipment can be sensitive to signal strength. Consequently, location of communication equipment to be installed at the well-site can be determined based on the signal survey. In some implementations, an equipment schedule can be provided based on the signal survey and/or the well-site survey. In some examples, the equipment schedule provides an inventory of equipment that is to be installed at the well-site to enable remote monitoring (e.g., data collection) and/or control of equipment at the well-site. In some examples, for one or more pieces of equipment included in the equipment schedule, a location for placement (installation) of the equipment at the well-site can be provided.

Figure 5:
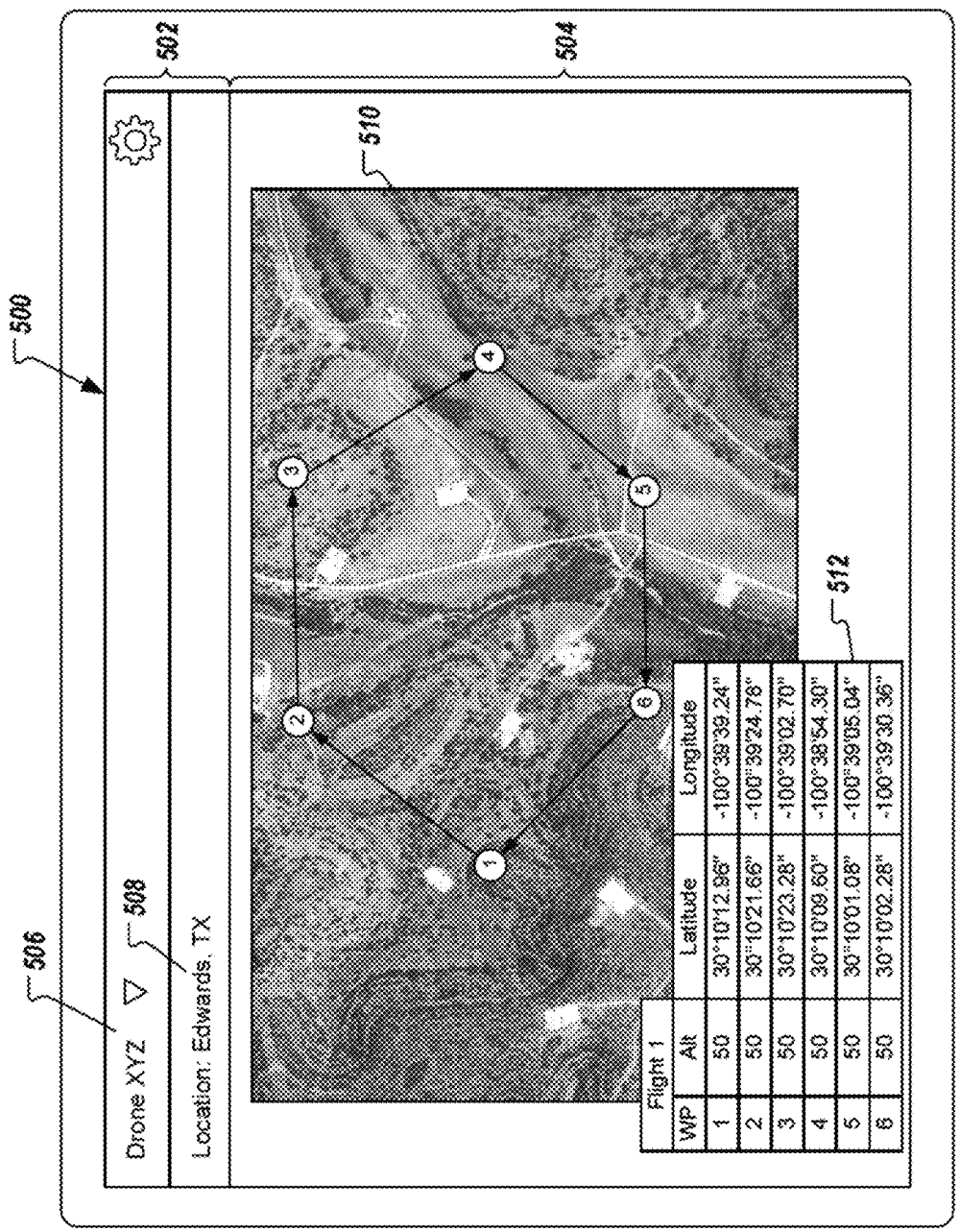
FIG. 5 depicts an example screen-shot of an interface for a drone flight path.

FIG. 5 depicts an example screen-shot of an interface 500 for a drone flight. More particularly, the interface 500 can be provided by a computer-executable program executing on a computing device, e.g., the computing device 105. In the depicted example, the interface includes a header 502 and a flight path interface 504. In some examples, the header 502 indicates a drone identifier 506 assigned to a particular aerial drone, for which a flight path is being defined. In some examples, the header 502 includes a location identifier 508 that generally identifies the geographic region, which the aerial drone is to fly over and record data, as described herein.

In some examples, the flight path interface 504 depicts an image 510 of the geographical region, which the aerial drone is to fly over and record data. In some examples, a user that is plotting the flight path can zoom in/out of the image 510. In the depicted example, the flight path interface 504 includes a waypoint plot interface 512. In the depicted example, the waypoint plot interface 512 is assigned to a particular flight of the aerial drone (e.g., "Flight 1"). It is contemplated that multiple flights for the aerial drone can be plotted using the flight path interface 504. In some examples, the user can add a way-point to the waypoint plot interface 512 and can include data defining the waypoint. Example data includes altitude, latitude and longitude. In some examples, the latitude and longitude indicate a particular location that the aerial drone is to fly to, and the altitude indicates an altitude that the aerial drone is to maintain, while at the particular location.

In some examples, the user can plot waypoints directly in the image 510. For example, the user can tap (or click-on) a location in the image 510, and in response, a waypoint can be displayed. In some examples, data corresponding to the waypoint can be automatically displayed in the waypoint plot interface 512. In some examples, the user can move waypoints displayed in the waypoint plot interface 512, and the data associated with moved waypoints can be automatically updated in the waypoint plot interface 512.

In some examples, the user can commit a flight path, and in response, flight path data can be automatically uploaded to the aerial drone. In some examples, the flight path data defines the waypoints, including an order of the waypoints, of the flight path. In some examples, the aerial drone can be commanded to fly a particular flight path to record data over the corresponding geographical region. In some examples, an interface can be provided (e.g., on a computing device) that enables the user to command the aerial drone to fly a defined flight path, and record data.

Figure 6:
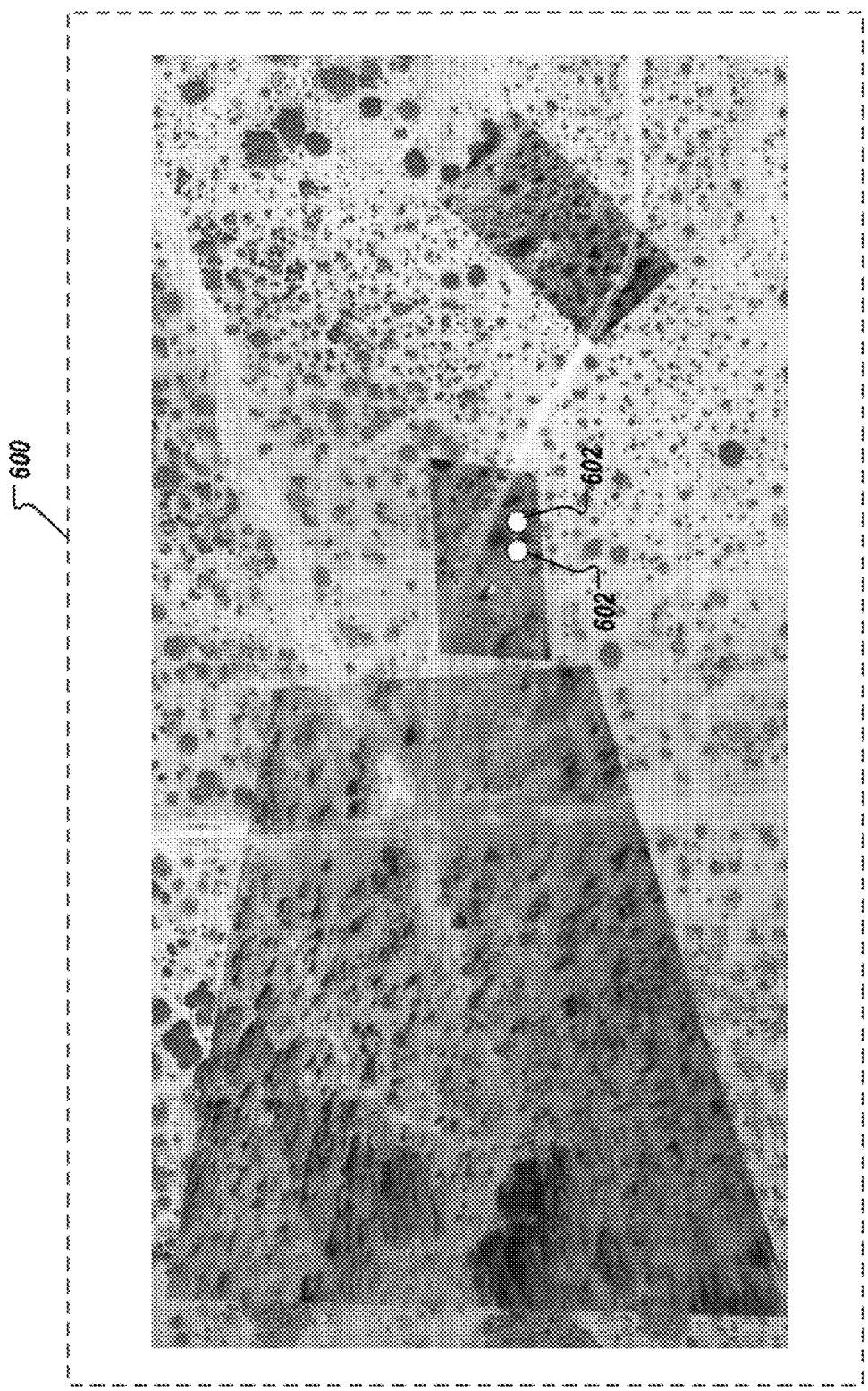
FIG. 6 depicts an example screen-shot depicting an example composite image.

FIG. 6 depicts an example screen-shot depicting an example composite image 600. In some examples, and as described herein, the composite image 600 is provide based on data captured by an aerial drone. In some examples, the composite image 600 is provided based on a plurality of images of the geographic region. In the depicted example, the equipment 602 is depicted in the composite image 600.

FIG. 7 depicts an example screen-shot depicting a zoomed portion 700 of the example composite image 600 of FIG. 6. In the example of FIG. 7, the equipment 602 is displayed. In some examples, respective identifiers 702 are provide for the equipment 602. In some examples, and as described herein, a type of the equipment 602 can automatically be determined based on the data captured for the geographical region. In some examples, the identifiers can be automatically selected based on the type of equipment. In the depicted example, it was automatically determined that the equipment 602 includes storage tanks. Consequently, the identifiers 702 are automatically assigned to the equipment. In some examples, it can be determined that multiple equipment of the same type is depicted. Consequently, and as depicted in FIG. 7, the identifiers can include numbers (e.g., "Tank 1," "Tank 2").

In the example of FIG. 7, a signal map 710 is depicted. In the depicted example, the signal map 710 includes regions 712, 714, 716. In some examples, each region is based on signal strength. For example, and as described above, the aerial drone measures signal strength (e.g., of an RPMA signal) at various locations over the geographical region. In the depicted example, the region 712 indicates strong signal strength, the region 714 indicate moderate signal strength, and the region 716 indicates weak signal strength. In some examples, the region 716 can be referred to as a so-called "dead-zone," within which signal strength is so weak that signal-based (e.g., RPMA-based) communications are not reliable, or not possible.

In accordance with implementations of the present disclosure, the signal map 710 within the image 700 is an example signal survey. In some examples, the signal map 710 can be used to determine placement of equipment. For example, it can be determined that one or more sensors associated with the equipment 602 (e.g., level sensors, NOx sensors) are to be remotely monitored. Consequently, communications equipment is to be installed proximate to the equipment 602. For example, an access point 216 and/or a gateway 232 of FIG. 2, are to be installed. Using the signal map, it can be determined that the communications equipment is not to be located within the region 716, and is preferably to be located in the region 712.

Figure 8:
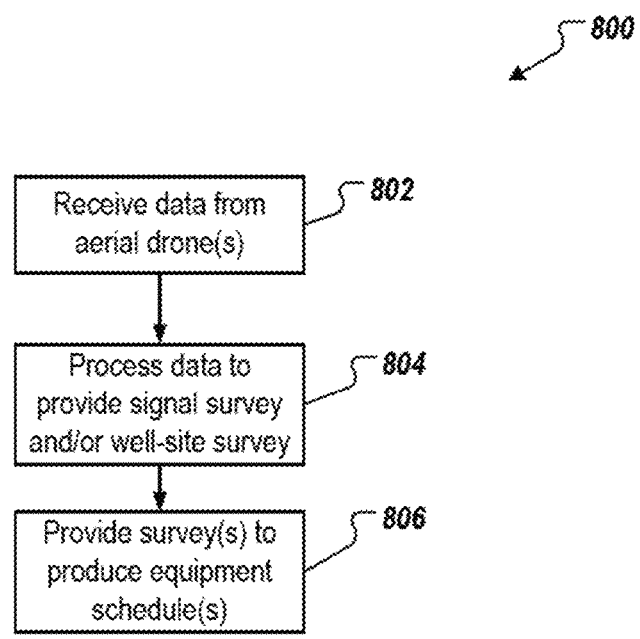
FIG. 8 depicts an example process that can be executed in accordance with implementations of the present disclosure.

FIG. 8 depicts an example process 800 that can be executed in accordance with implementations of the present disclosure. In some examples, the example process 800 can be provided as one or more computer-executable programs executed using one or more computing devices. In some examples, the process 800 is executed to survey equipment and/or signals at a well-site using one or more aerial drones.

Data provided from one or more aerial drones is received (802). For example, data collected by an aerial drone is provided to the computing cloud 107 of FIG. 1. In some examples, the data includes signal measurement data, location data, and one or more of image data and video data associated with a well-site. The data is processed to provide a signal survey and/or a well-site survey associated with the well-site (804). In some examples, the signal survey indicates a strength of a signal at multiple locations of the well-site. In some examples, the well-site survey indicates one or more pieces of equipment located at the well-site. The signal survey and the well-site survey are provided to produce one or more equipment schedules (806). In some examples, an equipment schedule identifies equipment to be installed at the well-site and, for at least one piece of equipment, a location to install the at least one piece of equipment.

Implementations of the subject matter and the operations described in this specification can be realized in digital electronic circuitry, or in computer software, firmware, or hardware, including the structures disclosed in this specification and their structural equivalents, or in any appropriate combinations thereof. Implementations of the subject matter described in this specification can be realized using one or more computer programs, i.e., one or more modules of computer program instructions, encoded on computer storage medium for execution by, or to control the operation of, data processing apparatus, e.g., one or more processors. In some examples, program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. In some examples, the data processing apparatus can include special purpose logic circuitry, e.g., an FPGA (field programmable gate array) or an ASIC (application specific integrated circuit). In some examples, the data processing apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer can include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LED (light-emitting diode) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

While this specification contains many specific implementation details, these should not be construed as limitations on the scope of any implementation of the present disclosure or of what may be claimed, but rather as descriptions of features specific to example implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for surveying equipment and/or signals at well sites using an aerial drone, the method being executed using one or more processors and comprising:
   providing, by the one or more processors, a plurality of waypoints to the aerial drone to control the aerial drone fly over a flight path defined by the plurality of waypoints;
   receiving, by the one or more processors, survey data provided from the aerial drone, the survey data comprising signal measurement data from equipment monitoring sensors, location data, and one or more of image data and video data associated with a well-site located within the flight path;
   processing, by the one or more processors, the survey data to provide one or more of a signal survey and a well-site survey associated with the well-site, the signal survey indicating a strength of a signal at multiple locations of the well-site, the well-site survey indicating a location of one or more pieces of existing well-site equipment located at the well-site;
   determining, by the one or more processors, a location to install communications equipment at the well-site based on the signal survey and the well-site survey; and
   providing, by the one or more processors, an equipment schedule based on the one or more of the signal survey and the well-site survey, the equipment schedule identifying one or more pieces of communications equipment to be installed at the well-site and providing the location to install the one or more pieces of communications at least one piece of equipment, wherein the one or more pieces of communications equipment to be installed at the location are to enable remote monitoring of the one or more pieces of existing well-site equipment located at the well-site.

2. The method of claim 1, further comprising providing the one or more of the signal survey and the well-site survey to a mobile computing device for display of a graphical representation of the well-site based on the one or more of the signal survey and the well-site survey.

3. The method of claim 2, wherein the graphical representation comprises a signal map that indicates signal strengths at locations within the well-site.

4. The method of claim 2, wherein the graphical representation comprises a multi-dimensional representation of the well-site.

5. The method of claim 2, wherein the graphical representation comprises one or more labels, each label identifying a type of equipment at the well-site, and being automatically determined based on processing the data.

6. The method of claim 1, wherein processing the data to provide one or more of a signal survey and a well-site survey comprises processing the data based on one or more well-site models to identify at least one piece of equipment located at the well-site.

7. The method of claim 1, wherein the one or more pieces of communications equipment that is to be installed at the well-site enable remote control of the one or more pieces of equipment located at the well-site.

8. The method of claim 1, wherein the signal comprises a random phase multiple access (RPMA) signal.

9. The method of claim 1, wherein the one or more pieces of existing well-site equipment located at the well-site comprises one or more sensors installed at the well-site.

10. The method of claim 9, further comprising determining that at least one sensor type is to be monitored, the sensor type being associated with the equipment monitoring sensors,
    wherein the location to install the one or more pieces of communications equipment is determined based on location of one or more equipment monitoring sensors that have the sensor type.

11. A non-transitory computer-readable storage medium coupled to one or more processors and having instructions stored thereon which, when executed by the one or more processors, cause the one or more processors to perform operations for surveying equipment and/or signals at well sites using an aerial drone, the operations comprising:
   providing a plurality of waypoints to the aerial drone to control the aerial drone fly over a flight path defined by the plurality of waypoints;
   receiving survey data provided from the aerial drone, the survey data comprising signal measurement data, location data, and one or more of image data and video data associated with a well-site located within the flight path;

processing the survey data to provide one or more of a signal survey and a well-site survey associated with the well-site, the signal survey indicating a strength of a signal at multiple locations of the well-site, the well-site survey indicating one or more pieces of existing well-site equipment located at the well-site;

determining, by the one or more processors, a location to install communications equipment at the well-site based on the signal survey and the well-site survey; and providing, by the one or more processors, an equipment schedule based on the one or more of the signal survey and the well-site survey, the equipment schedule identifying one or more pieces of communications equipment to be installed at the well-site and providing the location to install the one or more pieces of communications at least one piece of equipment, wherein the one or more pieces of communications equipment to be installed at the location are to enable remote monitoring of the one or more pieces of existing well-site equipment located at the well-site.

12. The non-transitory computer-readable storage medium of claim 11, wherein operations further comprise providing the one or more of the signal survey and the well-site survey to a mobile computing device for display of a graphical representation of the well-site based on the one or more of the signal survey and the well-site survey.

13. The non-transitory computer-readable storage medium of claim 12, wherein the graphical representation comprises a signal map that indicates signal strengths at locations within the well-site.

14. The non-transitory computer-readable storage medium of claim 13, wherein the signal map comprises a heat map including a plurality of regions.

15. The non-transitory computer-readable storage medium of claim 12, wherein the graphical representation comprises a multi-dimensional representation of the well-site.

16. A system, comprising:
a computing device; and
a computer-readable storage device coupled to the computing device and having instructions stored thereon which, when executed by the computing device, cause the computing device to perform operations comprising:

receiving a plurality of waypoints defining a flight path for an aerial drone;

providing the plurality of waypoints to the aerial drone to control the aerial drone fly over the flight path and record survey data comprising signal measurement data from equipment monitoring sensors, location data, and one or more of image data and video data associated with a well-site located within the flight path;

receiving survey data provided from the aerial drone;

processing the survey data to provide one or more of a signal survey and a well-site survey associated with the well-site, the signal survey indicating a strength of a signal at multiple locations of the well-site, the well-site survey indicating one or more pieces of existing well-site equipment located at the well-site;

determining a location to install communications equipment at the well-site based on the signal survey and the well-site survey; and providing an equipment schedule based on the one or more of the signal survey and the well-site survey, the equipment schedule identifying one or more pieces of communications equipment to be installed at the well-site and providing the location to install the one or more pieces of communications equipment, wherein the one or more pieces of communications equipment to be installed at the location are to enable remote monitoring of the one or more pieces of existing well-site equipment located at the well-site.

17. The system of claim 16, wherein operations further comprise providing the one or more of the signal survey and the well-site survey to a mobile computing device for display of a graphical representation of the well-site based on the one or more of the signal survey and the well-site survey.

18. The system of claim 17, wherein the graphical representation comprises a signal map that indicates signal strengths at locations within the well-site.

19. The system of claim 18, wherein the signal map comprises a heat map including a plurality of regions.

20. The system of claim 17, wherein the graphical representation comprises a multi-dimensional representation of the well-site.

* * * * *

UNITED STATES PATENT AND TRADEMARK OFFICE
CERTIFICATE OF CORRECTION

PATENT NO. : 10,192,182 B2
APPLICATION NO. : 14/734153
DATED : January 29, 2019
INVENTOR(S) : John Whipple et al.

Page 1 of 1

It is certified that error appears in the above-identified patent and that said Letters Patent is hereby corrected as shown below:

In the Claims

Column 16, Line 15, Claim 1, after communications delete "at least one piece of".

Column 17, Line 18, Claim 11, after communications delete "at least one piece of".

Signed and Sealed this
Ninth Day of April, 2019

Andrei Iancu
*Director of the United States Patent and Trademark Office*